UNITED STATES PATENT OFFICE.

JEAN BLANC, OF NEW ORLEANS, LOUISIANA.

IMPROVEMENT IN PREPARING VEGETABLE FIBER.

Specification forming part of Letters Patent No. 13,636, dated October 9, 1855.

*To all whom it may concern:*

Be it known that I, JEAN BLANC, of New Orleans, in the parish of New Orleans, and in the State of Louisiana, have discovered certain new fibrous substances and a new and useful process of extracting the fiber therefrom; and I do hereby declare that the following is a full and exact description thereof.

The nature of my invention consists in the discovery of certain new and useful plants containing important fibers and textile substances which can be used as either cloth, thread, rope, and paper, and a new and useful process of extracting the fiber from the woody substance of the plant without injuring the fiber as to its strength or beauty.

To enable others skilled in the art to use my discovery, I will proceed to describe the plants and the process for obtaining the fiber from them, the same process being applicable to all of the herein-named plants: *Hibiscus palustris*, cotton-stalk, *Malva*, *Veronica Virginica*, wild indigo, *Palma Christi*, *Asclepias asmarma*, *Asclepias cornuta*, *Asclepias incarnata* or *gigantea*, *Tuberosa*, *Asclepias curassávica*, hollyhock, mallow, nettle, *Wild cent foi* or *Luzerne*, *Althea*, black mulberry, white mulberry, *Morus multicaulis*, *Otaheitan mulberry*, yellow willow, manila, *Okra*, passion-flower plant, *Lizeron*, *Œnothera serotina*, Kentucky or ordinary hemp, ordinary flax, sugar-cane, and grape-vine.

In my process I cut the plants in August or September close to the ground and sink a pit in the field where the plants grow from six inches to two feet deep, throwing the earth outside, forming an embankment around the pit. I then commence in the center of the pit and set the plants in a perpendicular position with their butts downward, (and as soon as the plants are cut, before they have time to die, and while they are still green and alive,) and continue to set up around the same, keeping them as nearly perpendicular as I can, and pressing them closely together until I have filled the pit with the plants or the sprouts of the trees, which I cut when young and tender. I then commence covering the sides of the same with leaves or straw, so as to surround it perfectly. Then I commence throwing the earth against the sides on the leaves or straw, making it several inches thick, until the whole is incased in a wall of earth as high as the tops of the plants, leaving the top of the stack or pile uncovered. The reason for my doing so is that by excluding the surrounding current of the atmosphere and the heat of the sun from the plants I cause the gas contained in the natural state of the plants to be evolved or cast off by degrees or slowly, and as it is carried off at the top of the plants the moisture of the earth rises up and through the plants and destroys the glutinous particles thereof, and causes the fiber to separate from the woody substance, preserving its strength and elasticity and changing the color to a light yellow. After I have prepared my pit or stack, which may be of any size that the quantity to preserve may indicate, I let it remain in this state from eight to fifteen days, when generally the process will be sufficient. This may be known by taking from the stack at different points and trying it. If the bark will separate easily from the woody substance and a slight mouldy appearance is visible, then it is time to break up the pit and spread it on the ground to dry. When the plant is dry, which will be in from five to ten days, the woody portion is separated by passing the plants through any ordinary roller or beaters or by horses treading on them. By this process I get the fiber from the wood and have all its strength and elasticity preserved, and am now enabled to manage it without having such great quantities to handle. Several of the fibers of the finest qualities will be perfectly prepared by this process for manufacturing. The coarser fibers can be water-rotted for a few days—say six to eight—when they can be fitted for market or manufacturing by the common process of breaking, scutching, and hackling common to flax or hemp.

I do not claim burying the plants in either wet sand or mud, as described in the India process found in the agricultural reports of the Patent Office for 1854, page 174; nor do I claim simply setting the plants on end with the butts down, as described in the "Southern Cultivator."

Having thus fully described the nature of my discovery and process, what I claim as new, and desire to secure by Letters Patent, is—

The stacking of the plants butts down in a pit dug for said purpose and surrounding them with dry leaves or straw, with earth thrown around the same, thereby inclosing them entirely on all sides, leaving the top open and uncovered, as fully set forth herein.

JEAN BLANC.

Witnesses:
T. G. CLAYTON,
J. C. CLAYTON.